(12) United States Patent
Omura et al.

(10) Patent No.: US 11,927,112 B2
(45) Date of Patent: Mar. 12, 2024

(54) SEALING DEVICE AND ROTARY MACHINE

(71) Applicant: MITSUBISHI HEAVY INDUSTRIES, LTD., Tokyo (JP)

(72) Inventors: Naoto Omura, Tokyo (JP); Kazuyuki Matsumoto, Tokyo (JP); Yoshihiro Kuwamura, Tokyo (JP); Eiji Konishi, Tokyo (JP); Kentaro Tanaka, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/952,670

(22) Filed: Sep. 26, 2022

(65) Prior Publication Data

US 2023/0017440 A1 Jan. 19, 2023

Related U.S. Application Data

(63) Continuation of application No. PCT/JP2021/016402, filed on Apr. 23, 2021.

(30) Foreign Application Priority Data

Apr. 28, 2020 (JP) ................. 2020-079332

(51) Int. Cl.
  *F01D 5/20* (2006.01)
  *F01D 11/02* (2006.01)
  *F01D 11/08* (2006.01)
(52) U.S. Cl.
  CPC ............. *F01D 5/20* (2013.01); *F01D 11/02* (2013.01); *F01D 11/08* (2013.01); *F05D 2240/307* (2013.01)
(58) Field of Classification Search
  CPC ... F01D 5/20; F01D 11/02; F01D 11/08; F16J 15/447
  See application file for complete search history.

(56) References Cited

U.S. PATENT DOCUMENTS 8,128,351 B2 * 3/2012 Narita ................... F16J 15/162
  415/173.1
8,434,766 B2 * 5/2013 Zeng ..................... F16J 15/441
  277/412

(Continued)

FOREIGN PATENT DOCUMENTS

DE 11 2016 002 476 2/2018
EP 1914388 4/2008

(Continued)

OTHER PUBLICATIONS

International Search Report dated Jul. 13, 2021 in corresponding International Application No. PCT/JP2021/016402, with English language translation.

(Continued)

*Primary Examiner* — Eldon T Brockman
(74) *Attorney, Agent, or Firm* — Wenderoth, Lind & Ponack, L.L.P.

(57) ABSTRACT

A sealing device according to at least one embodiment includes not less than three arc-shaped fins arranged in an axial direction. The arc-shaped fins include: a first fin which is one of two outermost fins located on an outermost side in the axial direction; a second fin disposed adjacent to the first fin in the axial direction; and at least one third fin disposed opposite to the first fin across the second fin in the axial direction. It is preferable that the third fin is disposed to be inclined with respect to a radial direction such that a tip end portion is located on a side of the first fin in the axial direction relative to a base end portion, and the third fin has a larger inclination angle than the first fin or the second fin with respect to the radial direction.

11 Claims, 17 Drawing Sheets

(56) References Cited

U.S. PATENT DOCUMENTS

| | | | |
|---|---|---|---|
| 9,388,701 B2* | 7/2016 | Kuwamura | F01D 5/225 |
| 10,557,363 B2* | 2/2020 | Matsumoto | F01D 5/02 |
| 10,954,808 B2* | 3/2021 | Kuwamura | F16J 15/445 |
| 10,975,711 B2* | 4/2021 | Kuwamura | F16J 15/447 |
| 11,085,541 B2* | 8/2021 | Morinaka | F04D 29/162 |
| 11,306,603 B2* | 4/2022 | Iwasaki | F01D 25/00 |
| 2009/0142187 A1* | 6/2009 | Narita | F16J 15/4472 |
| | | | 415/173.1 |
| 2011/0182719 A1* | 7/2011 | Deo | F16J 15/442 |
| | | | 415/173.1 |
| 2011/0280715 A1* | 11/2011 | Garg | F16J 15/4472 |
| | | | 277/412 |
| 2012/0043728 A1* | 2/2012 | Zeng | F01D 11/02 |
| | | | 277/412 |
| 2012/0288360 A1* | 11/2012 | Kuwamura | F01D 11/02 |
| | | | 415/173.1 |
| 2013/0251534 A1* | 9/2013 | Matsumoto | F01D 5/147 |
| | | | 416/223 R |
| 2016/0333714 A1* | 11/2016 | Matsumoto | F16J 15/3264 |
| 2016/0341058 A1 | 11/2016 | Nishikawa et al. | |
| 2018/0163557 A1* | 6/2018 | Kuwamura | F01D 11/16 |
| 2018/0371927 A1* | 12/2018 | Kuwamura | F16J 15/22 |
| 2019/0277151 A1 | 9/2019 | Matsumoto | |
| 2021/0148249 A1* | 5/2021 | Iwasaki | F01D 5/12 |
| 2021/0180464 A1 | 6/2021 | Fujimura et al. | |

FOREIGN PATENT DOCUMENTS

| | | | | |
|---|---|---|---|---|
| EP | 2 415 970 | | 2/2012 | |
| JP | 8-338537 | | 12/1996 | |
| JP | 11-51200 | | 2/1999 | |
| JP | 2005-180278 | | 7/2005 | |
| JP | 2009047043 A | * | 3/2009 | F01D 5/225 |
| JP | 2010-159667 | | 7/2010 | |
| JP | 2013-174192 | | 9/2013 | |
| JP | 2015-140916 | | 8/2015 | |
| JP | 2017-155859 | | 9/2017 | |
| JP | 2018-48565 | | 3/2018 | |
| JP | 2019-49346 | | 3/2019 | |
| JP | 2019-120140 | | 7/2019 | |
| JP | 2019-157713 | | 9/2019 | |
| JP | 2019-203398 | | 11/2019 | |
| WO | 2018/155636 | | 8/2018 | |

OTHER PUBLICATIONS

Translation of the International Preliminary Report on Patentability dated Nov. 10, 2022 in corresponding International Application No. PCT/JP2021/016402.

Office Action dated Jul. 7, 2020 in corresponding Japanese Patent Application No. 2020-079332, with English language translation.

* cited by examiner

SEALING DEVICE AND ROTARY MACHINE

This application claims the priority of Japanese Patent Application No. 2020-079332 filed on Apr. 28, 2020, the content of which is incorporated herein by reference. This application is a continuation application based on a PCT Patent Application No. PCT/JP2021/16402 whose priority is claimed on Japanese Patent Application No. 2020-079332. The content of the PCT application is incorporated herein by reference.

TECHNICAL FIELD

The present disclosure relates to a sealing device and a rotary machine.

BACKGROUND

A rotary machine, such as a steam turbine or a gas turbine, used in a power plant or the like is known. The rotary machine includes a rotor blade supported by a turbine rotor (hereinafter, simply referred to as a rotor) rotatable with respect to a casing and a stator vane supported by the casing, and is configured to convert energy of a working fluid flowing from upstream to downstream in the axis direction of the rotor into rotational energy of the rotor.

In the above-described rotary machine, it is known that, in a sealing portion for sealing between the casing and the rotor or the rotor blade, the working fluid deviating from a main passage flows in while having a swirling flow component given when passing through a nozzle, generating a swirling flow (so-called swirl flow) in the circumferential direction of the rotor. Due to the swirl flow, if the rotor is eccentric, a periodic pressure distribution with a peak in a direction different from an eccentric direction of the rotor is generated in the circumferential direction of the rotor, which may cause a self-excited vibration of the rotor when the swirl flow increases with a high output operation, for example. Thus, various structures for suppressing the swirl flow in the sealing portion have been devised.

For example, a sealing device disclosed in Patent Document 1 includes a plurality of seal fins arranged on an inner peripheral surface of a casing in the axis direction, and a plurality of swirl breakers arranged at intervals in the circumferential direction to connect, of the plurality of seal fins, a first seal located on most axial one side and a second seal fin disposed adjacent to axial another side of the first seal fin, and the first seal is formed with a penetrating portion penetrating the first seal fin in the axis direction (see Patent Document 1).

CITATION LIST

Patent Literature

Patent Document 1: JP2017-155859A

SUMMARY

Technical Problem

In recent years, a rotary machine, such as a steam turbine or a gas turbine, is required to further improve turbine efficiency. Therefore, the rotary machine is required to suppress a leakage flow rate, that is, the flow rate of a working fluid that deviates from a main passage and passes through a sealing portion. However, if the leakage flow rate is suppressed, an exciting force of the above-described self-excited vibration may increase.

In view of the above, an object of at least one embodiment of the present disclosure is to suppress the flow rate of the working fluid passing through the sealing portion and to suppress occurrence of the self-excited vibration in the rotary machine.

Solution to Problem (1) A sealing device according to at least one embodiment of the present disclosure includes: not less than three arc-shaped fins spaced from each other in an axial direction, each of the arc-shaped fins extending along a circumferential direction. The arc-shaped fins include: a first fin which is one of two outermost fins located on an outermost side in the axial direction; a second fin disposed adjacent to the first fin in the axial direction; and at least one third fin disposed opposite to the first fin across the second fin in the axial direction. The third fin satisfies at least either of following condition (a) or (b): (a) the third fin is disposed to be inclined with respect to a radial direction such that a tip end portion is located on a side of the first fin in the axial direction relative to a base end portion, and the third fin has a larger inclination angle than the first fin or the second fin with respect to the radial direction; or (b) the third fin has a larger radial dimension than the first fin or the second fin so as to form a smaller seal gap than the first fin or the second fin.

(2) A rotary machine according to at least one embodiment of the present disclosure includes: the sealing device as defined in the above configuration (1); a casing; a rotor body for rotating around an axis in the casing; a plurality of rotor blade bodies mounted so as to extend from the rotor body in a radial direction; and a shroud connected to a tip end portion of each of the plurality of rotor blade bodies. The third fin is located on an axially downstream side of the rotor body relative to the first fin.

Advantageous Effects

According to at least one embodiment of the present disclosure, it is possible to suppress the flow rate of a working fluid passing through a sealing portion and to suppress occurrence of a self-excited vibration in a rotary machine.

DETAILED DESCRIPTION

Figure 1:
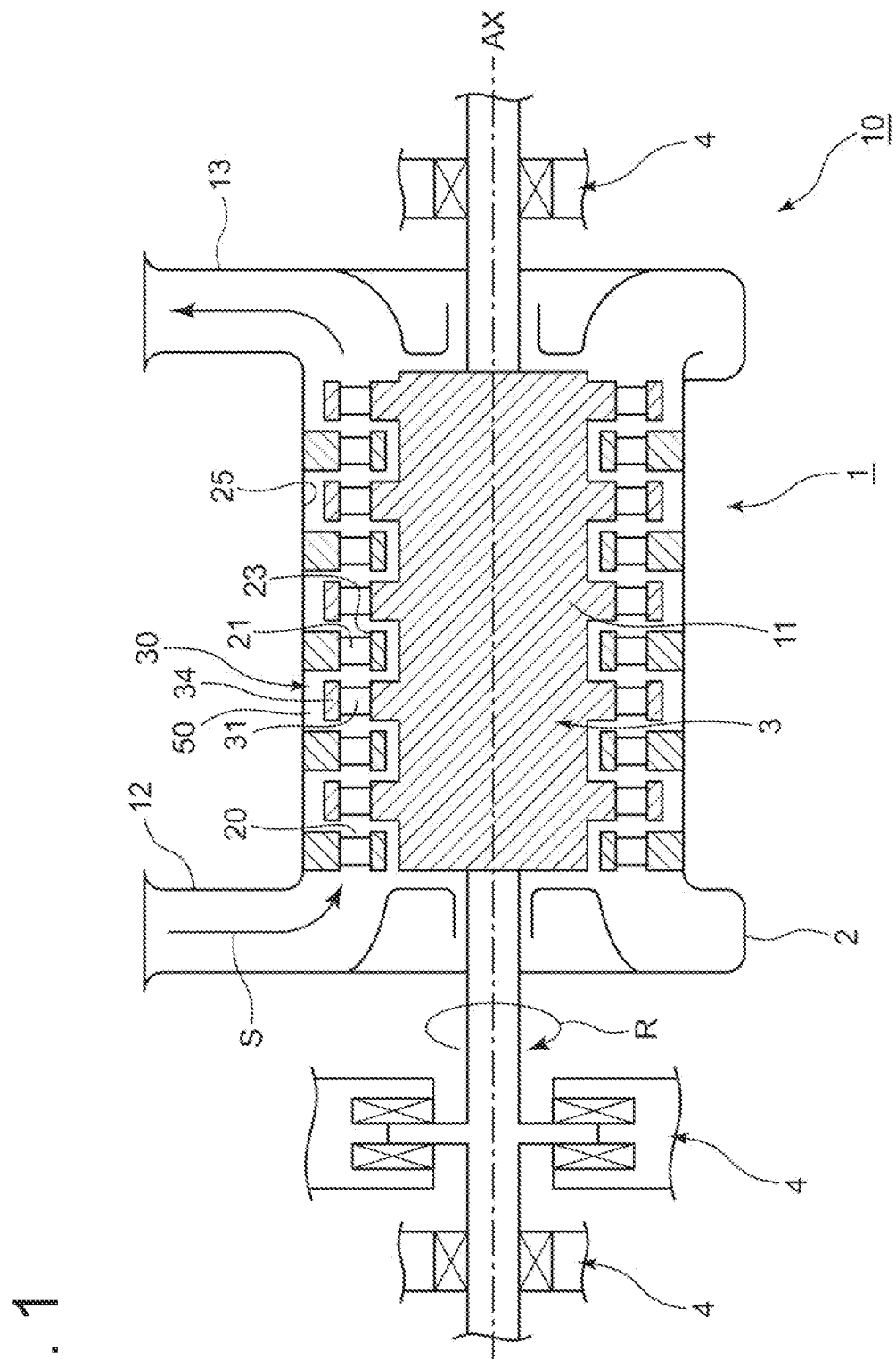
FIG. 1 is a view for describing a steam turbine as an example of a rotary machine including a sealing device according to some embodiments.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction". "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same". "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having". "containing", and "constituting" one constituent component are not exclusive expressions that exclude the presence of other constituent components.

(As to Configuration of Steam Turbine 1)

FIG. 1 is a view for describing a steam turbine as an example of a rotary machine including a sealing device according to some embodiments.

As shown in FIG. 1, a steam turbine plant 10 includes a steam turbine 1 which is an axial rotary machine, a steam supply pipe 12 for supplying steam S as a working fluid from a steam supply source (not shown) to the steam turbine 1, and a steam discharge pipe 13 connected to a downstream side of the steam turbine 1 to discharge steam.

As shown in FIG. 1, the steam turbine 1 according to some embodiments includes a casing 2, a rotor body 11 for rotating around an axis AX in the casing 2, a rotor 3 connected to the rotor body 11, and a bearing portion 4 for rotatably supporting the rotor body 11 around the axis AX. Further, the steam turbine 1 according to some embodiments shown in FIG. 1 includes a sealing device 100 which will be described in detail later.

The rotor 3 includes the rotor body 11 and turbine rotor blades 30. The turbine rotor blades 30 are a rotor blade row including a plurality of rotor blade bodies 31 and shrouds (tip shrouds) 34. A plurality of rows are disposed at regular intervals in the axis AX direction.

The plurality of rotor blade bodies 31 are mounted so as to extend in the radial direction from the rotor body 11 for rotating around the axis AX in the casing 2, and are disposed at intervals in the circumferential direction of the rotor body 11. Each of the plurality of rotor blade bodies 31 is a member having an airfoil cross-section, as viewed from the radial direction.

The shrouds 34 are annular tip shrouds continuing into respective tip end portions (radially outer end portions) of the plurality of rotor blade bodies 31 to connect the respective tip end portions.

The casing 2 is a nearly cylindrical member disposed so as to cover the rotor 3 from the outer peripheral side. The casing 2 is provided with a plurality of stator vane bodies 21 mounted so as to extend radially inward toward the rotor body 11. The plurality of stator vane bodies 21 are arranged along the circumferential direction of an inner peripheral surface 25 of the casing 2 and the axis AX direction. The plurality of stator vane bodies 21 are mounted with stator vane rings 23 continuing into respective tip end portions of the plurality of stator vane bodies 21.

Inside the casing 2, a region, where the stator vane bodies 21 and the rotor blade bodies 31 are arranged, forms a main passage 20 through which the steam S as the working fluid flows.

Further, a space is formed between the tip shroud 34 and the inner peripheral surface 25 of the casing 2, and the space will be referred to as a cavity 50. In the following description, an inner surface of the casing 2 facing the space in the casing 2 will be referred to as an inner surface 250. Therefore, the inner peripheral surface 25 of the casing 2 is a part of the inner surface 250.

Figure 2A:
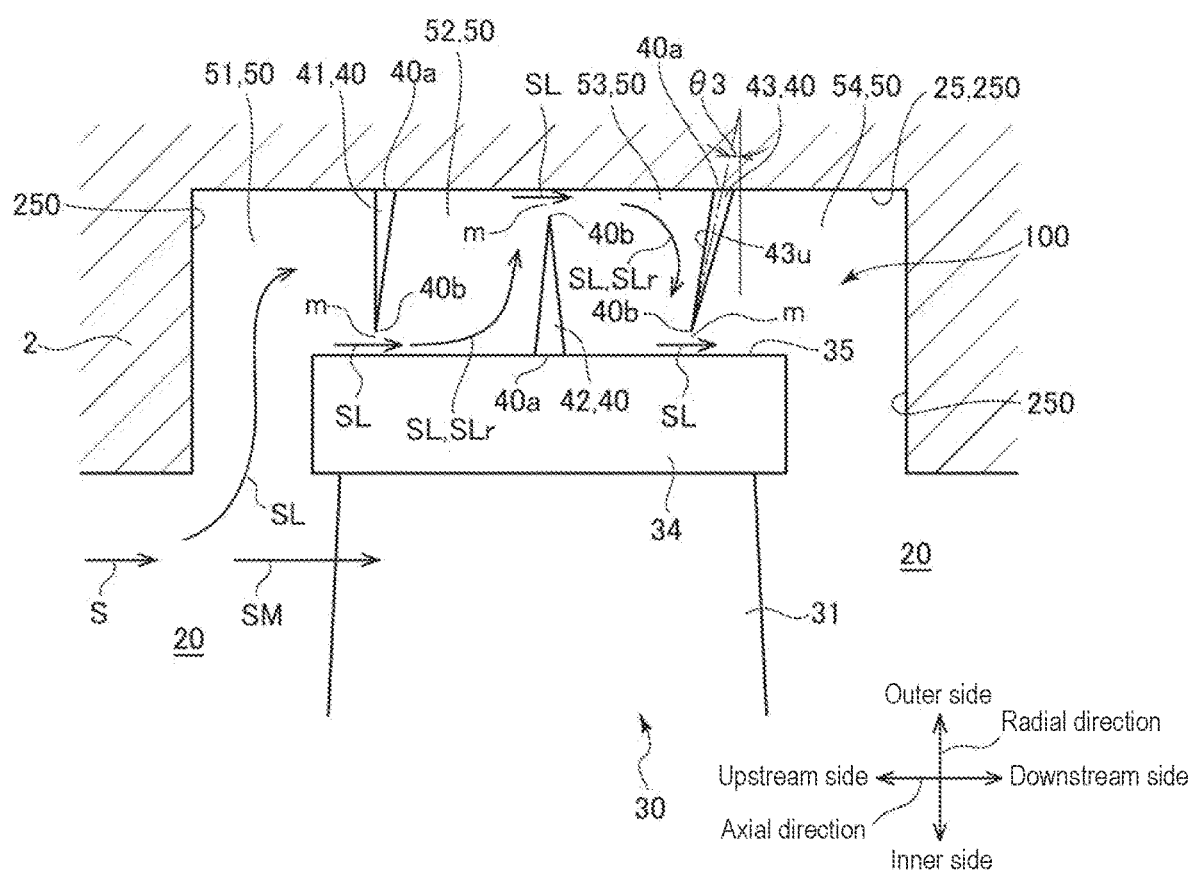
FIG. 2A is a view for describing the sealing device according to some embodiments.
Figure 2B:
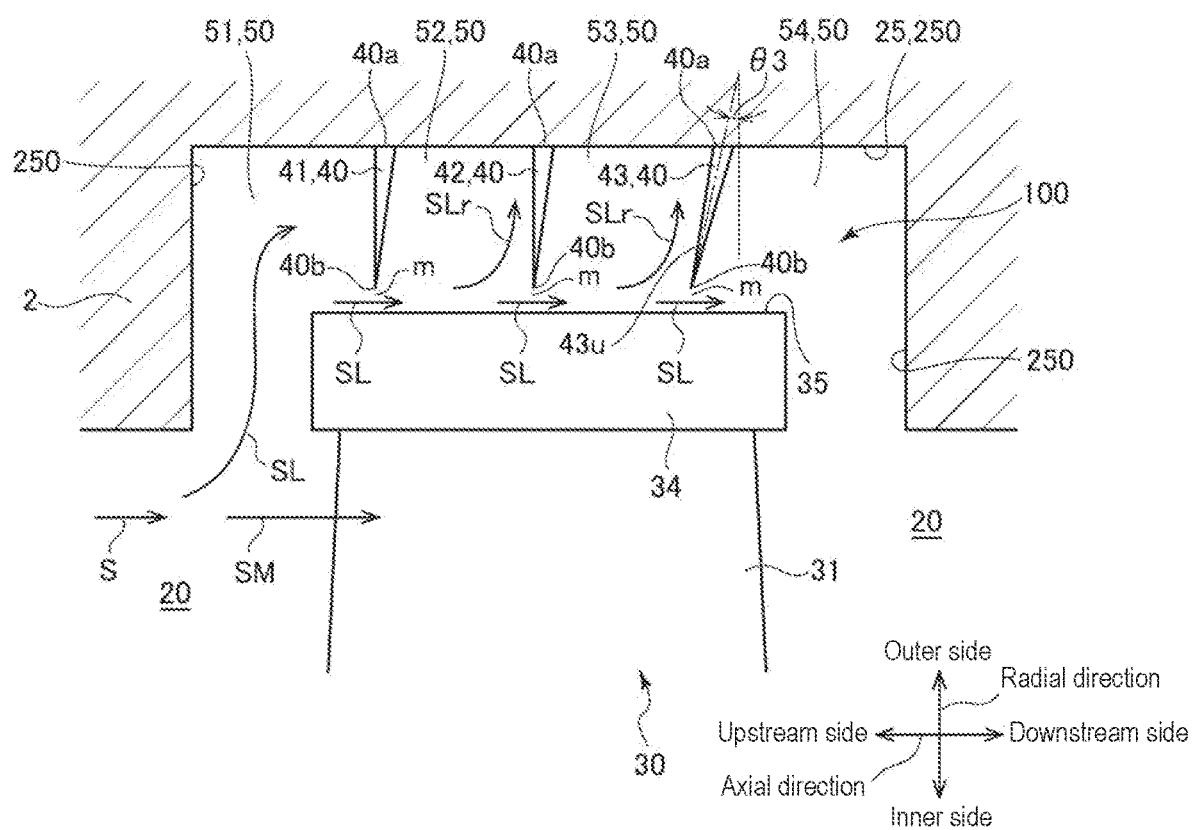
FIG. 2B is a view for describing the sealing device according to some embodiments.
Figure 2C:
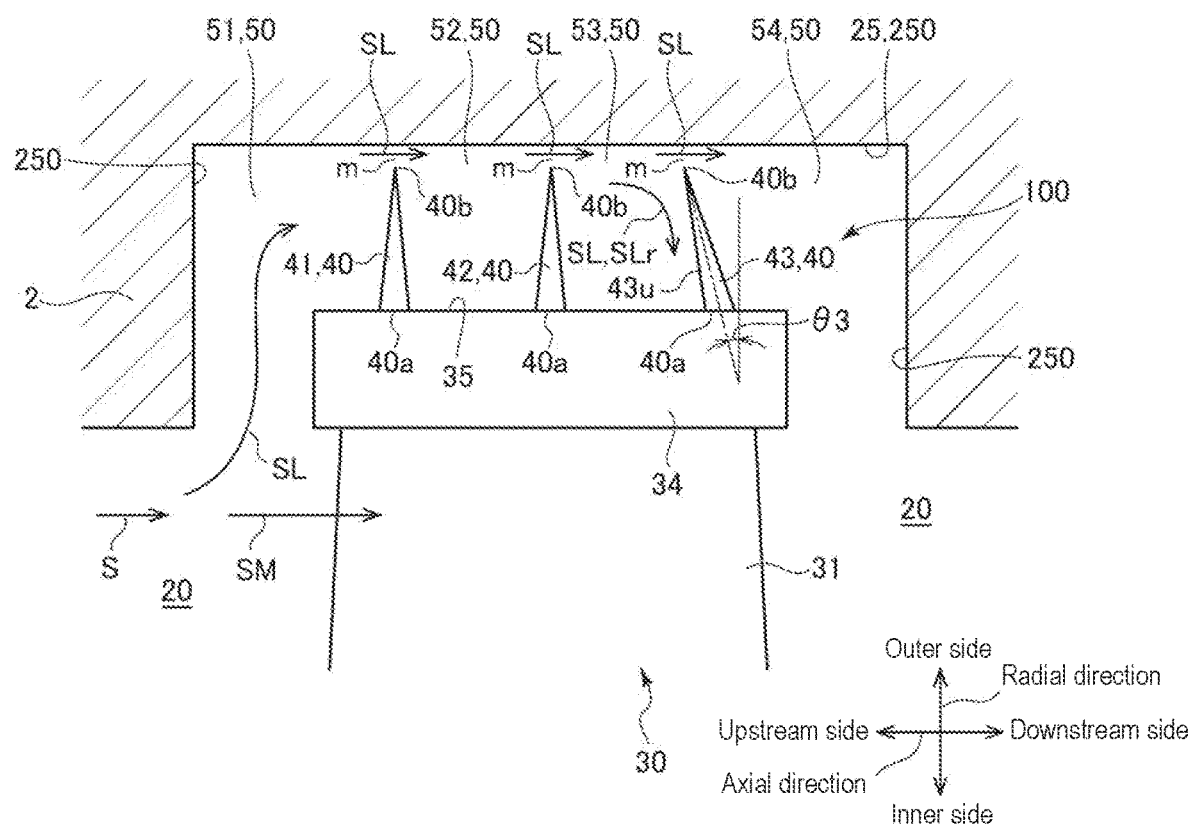
FIG. 2C is a view for describing the sealing device according to some embodiments.

FIGS. 2A to 2C are views for describing the sealing device according to some embodiments, and schematically show the vicinity of the tip shroud 34 as viewed from the circumferential direction.

Figure 3A:
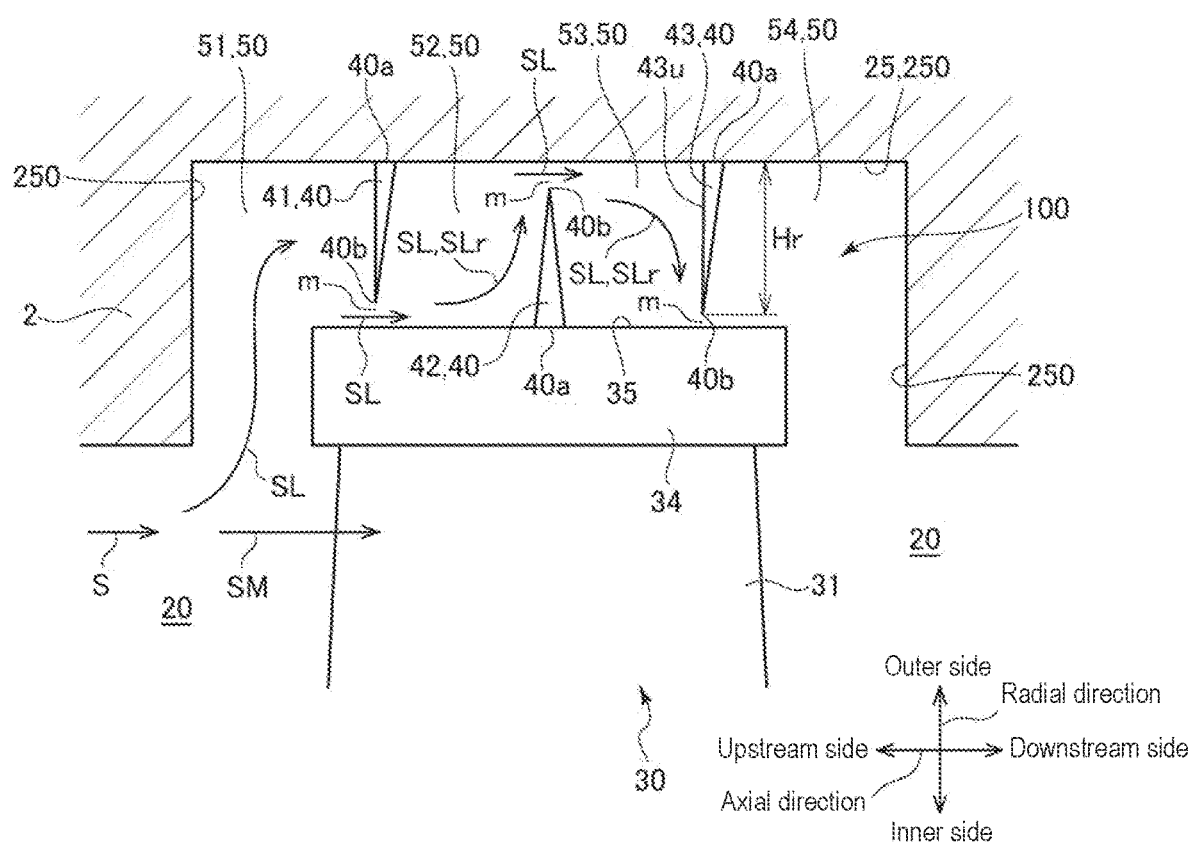
FIG. 3A is a view for describing the sealing device according to some embodiments.
Figure 3B:
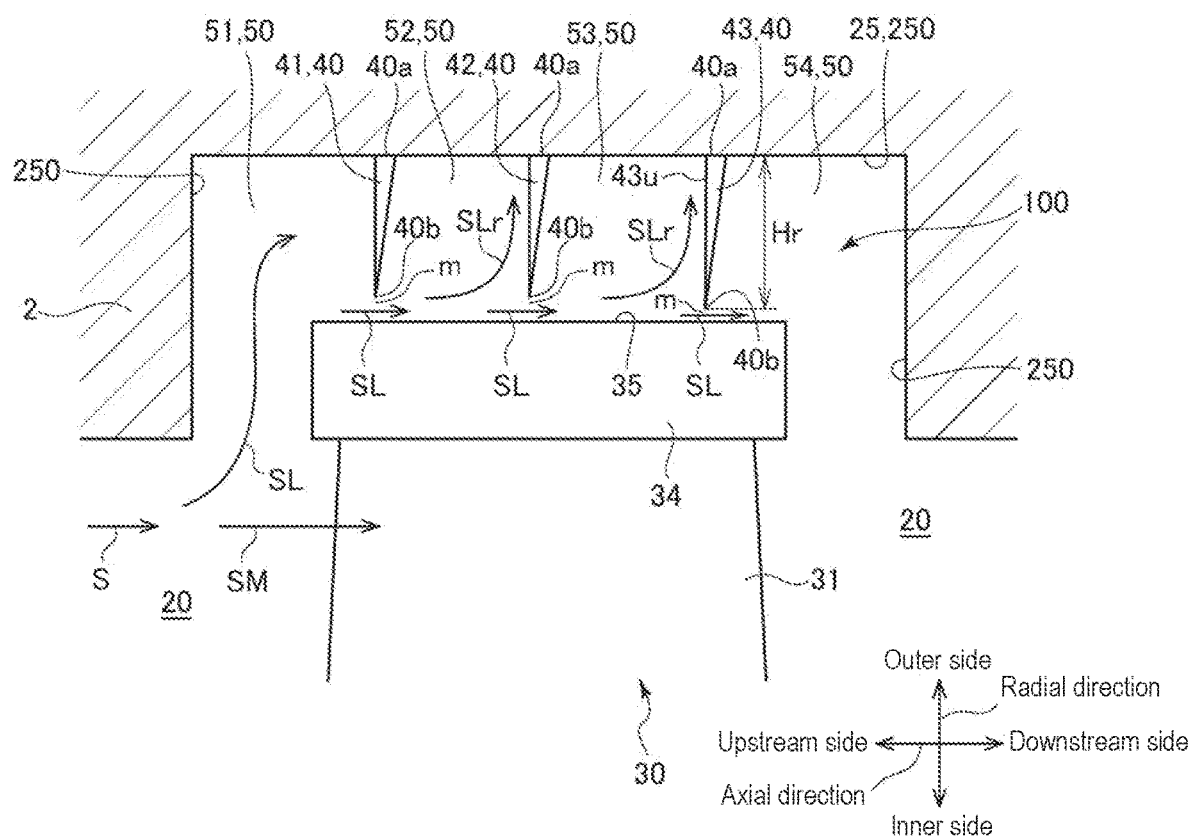
FIG. 3B is a view for describing the sealing device according to some embodiments.
Figure 3C:
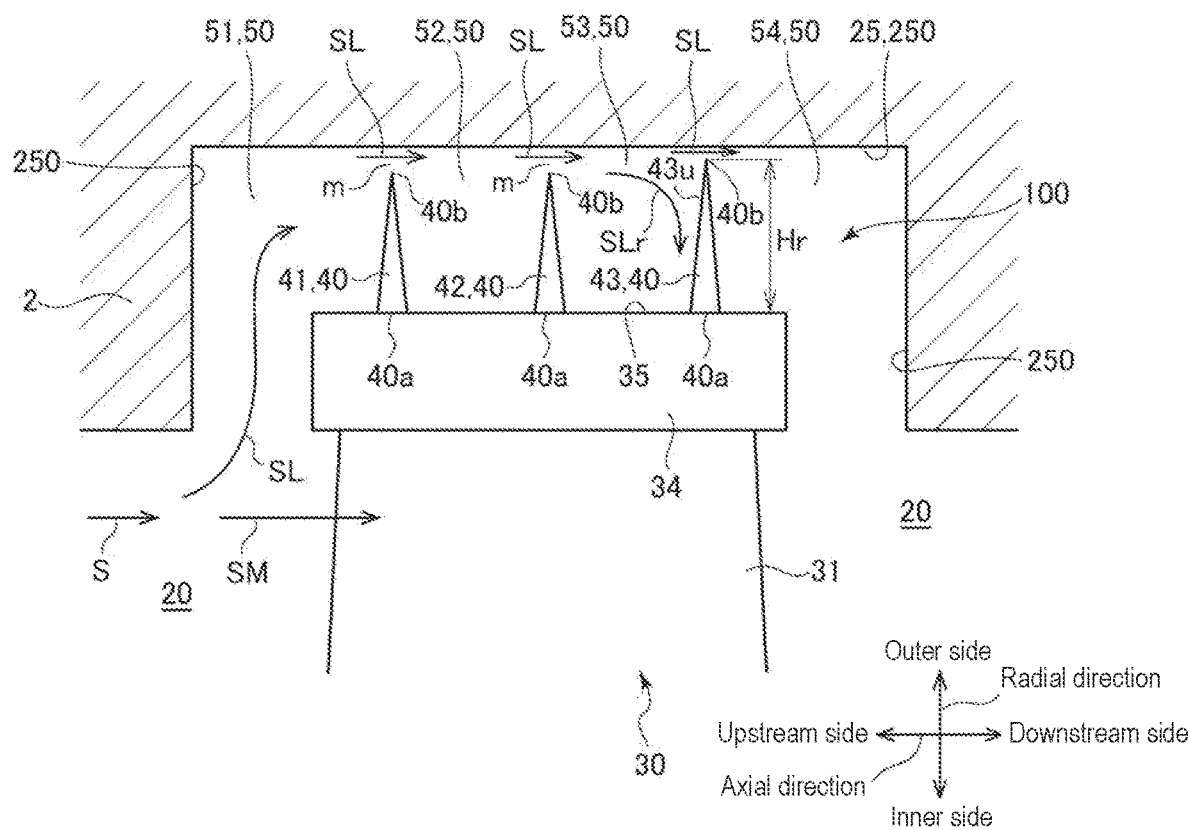
FIG. 3C is a view for describing the sealing device according to some embodiments.

FIGS. 3A to 3C are views for describing the sealing device according to some embodiments, and schematically show the vicinity of the tip shroud 34 as viewed from the circumferential direction.

Figure 4A:
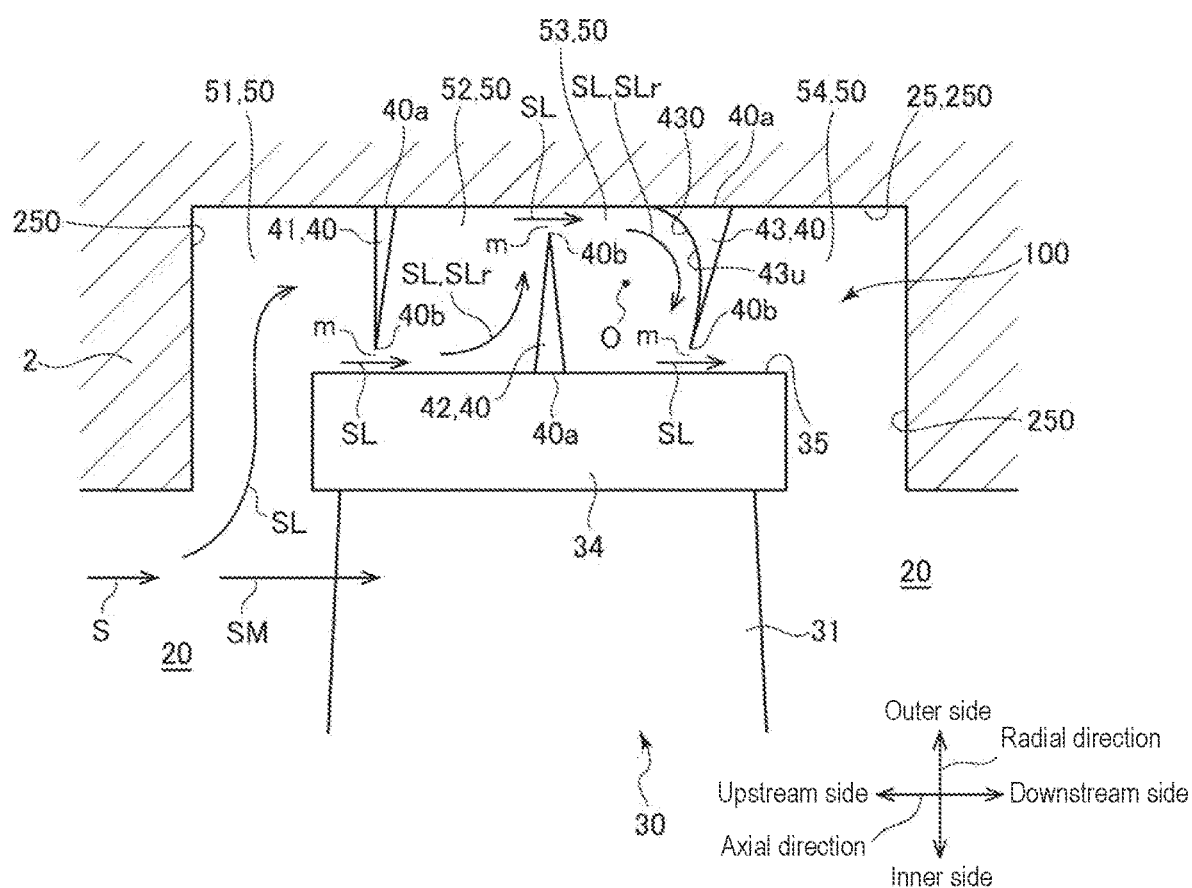
FIG. 4A is a view for describing the sealing device according to some embodiments.
Figure 4B:
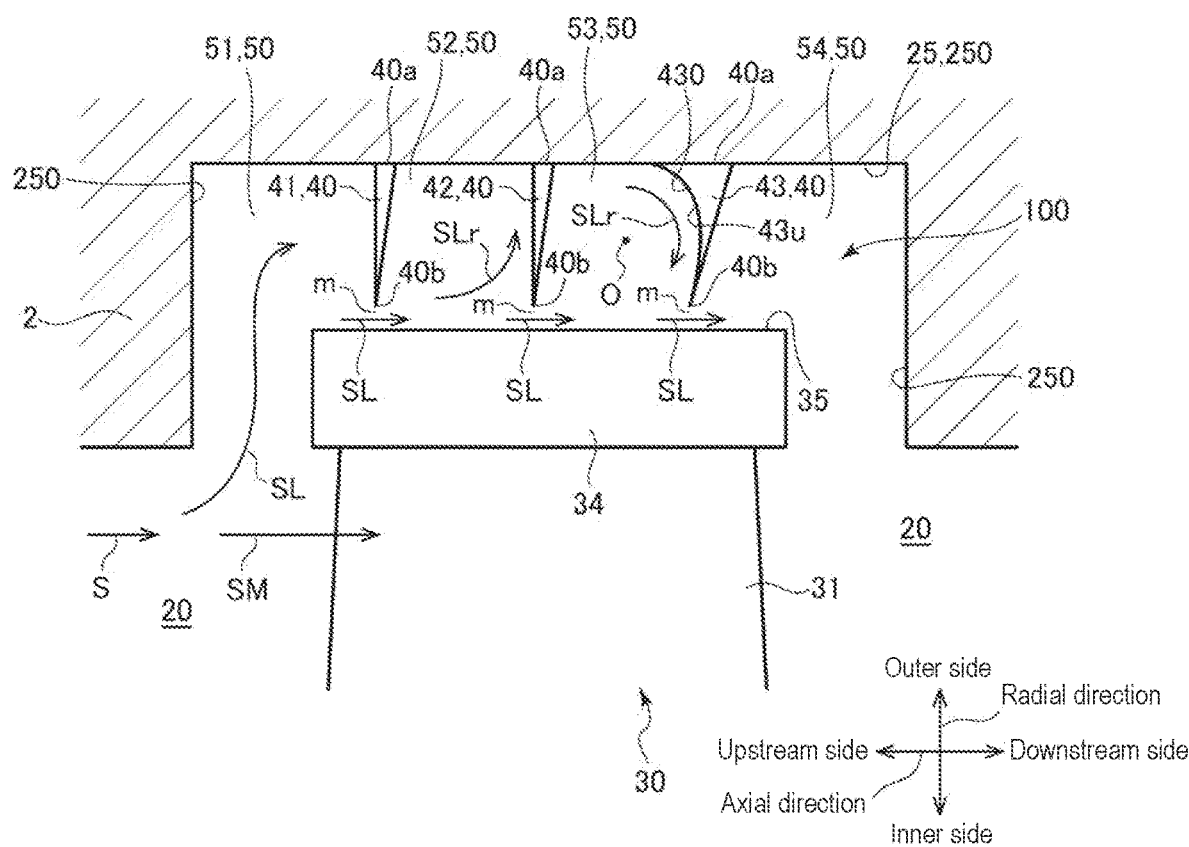
FIG. 4B is a view for describing the sealing device according to some embodiments.
Figure 4C:
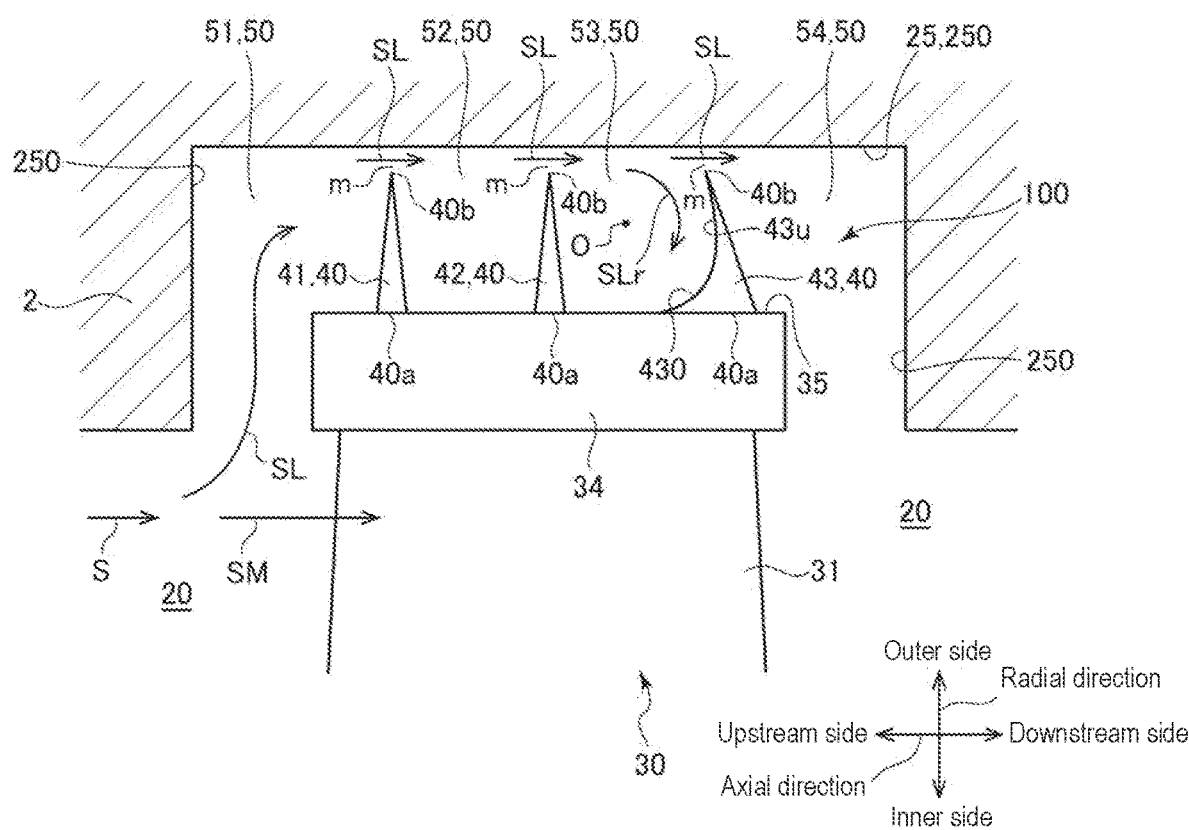
FIG. 4C is a view for describing the sealing device according to some embodiments.

FIGS. 4A to 4C are views for describing the sealing device according to some embodiments, and schematically show the vicinity of the tip shroud 34 as viewed from the circumferential direction.

Figure 5A:
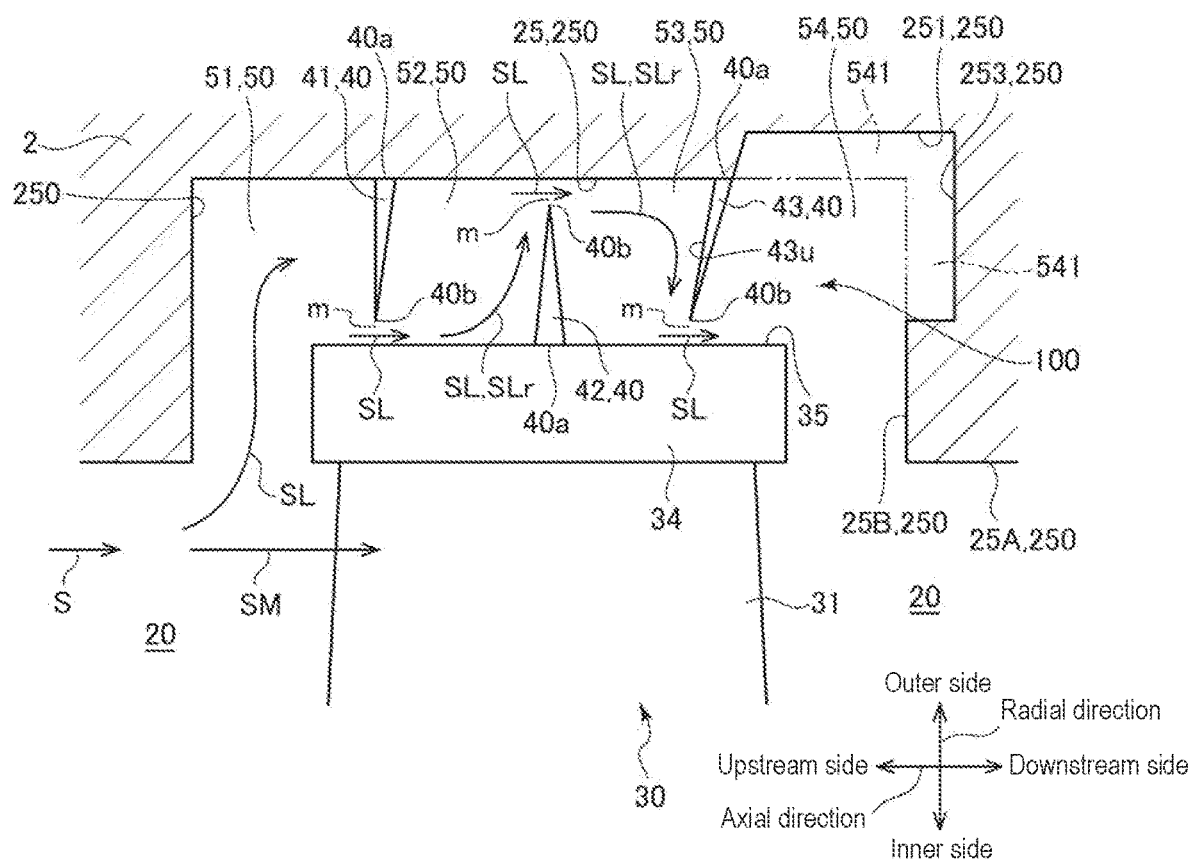
FIG. 5A is a view for describing the sealing device according to some embodiments.
Figure 5B:
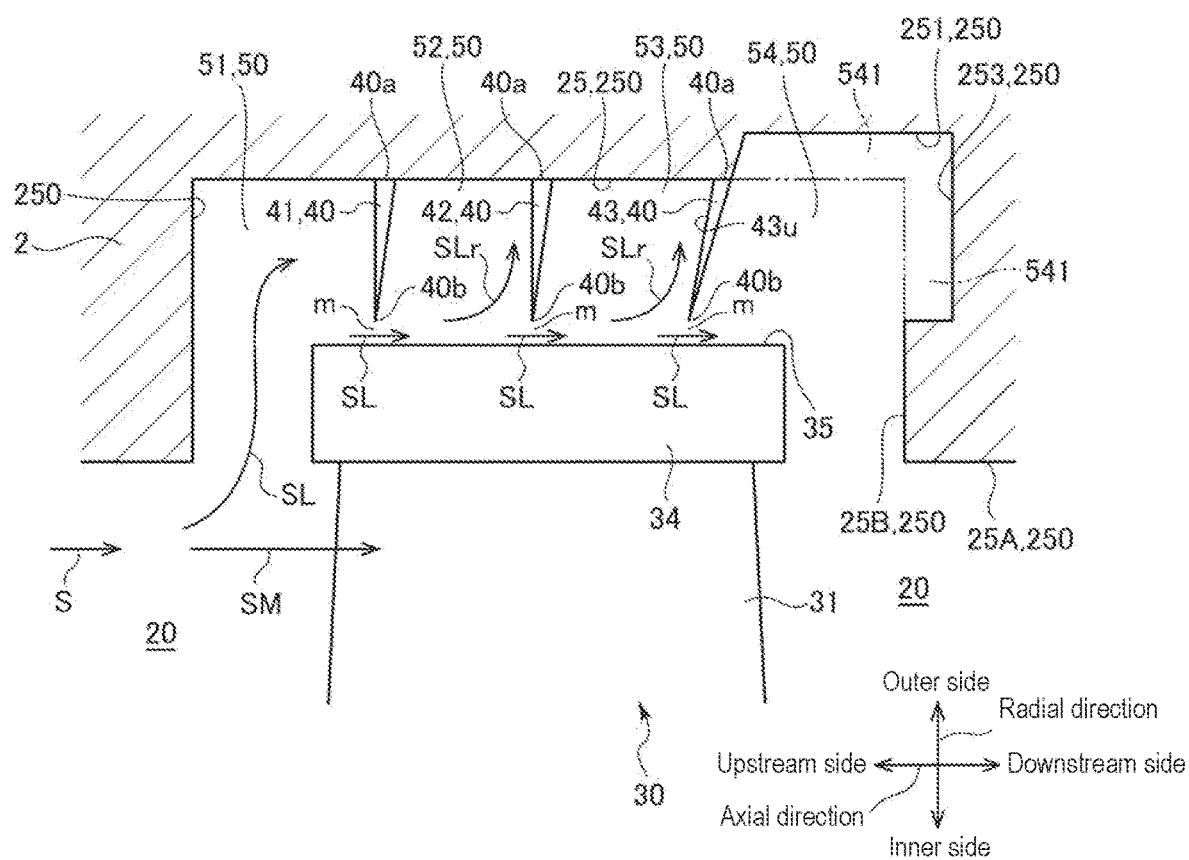
FIG. 5B is a view for describing the sealing device according to some embodiments.
Figure 5C:
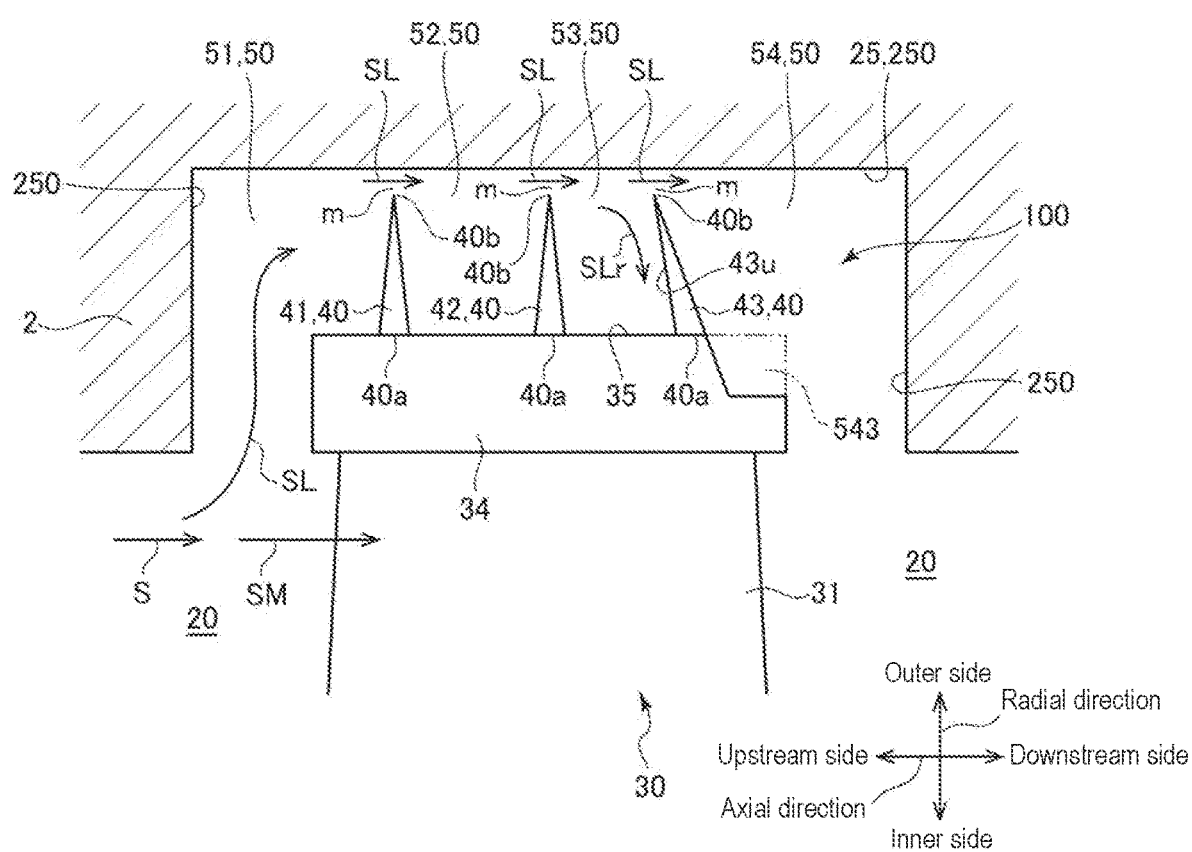
FIG. 5C is a view for describing the sealing device according to some embodiments.

FIGS. 5A to 5C are views for describing the sealing device according to some embodiments, and schematically show the vicinity of the tip shroud 34 as viewed from the circumferential direction.

Figure 6:
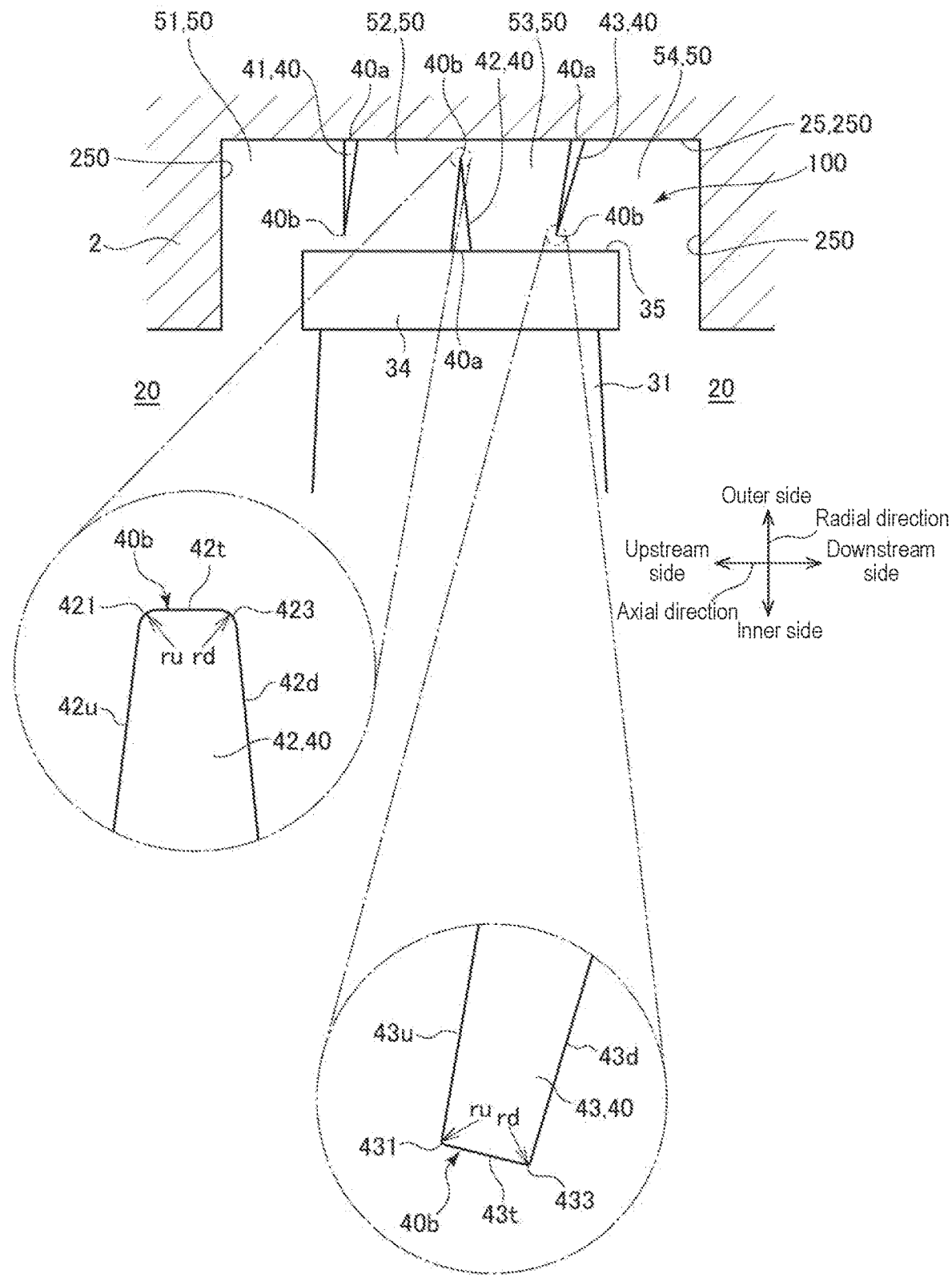
FIG. 6 is a view for describing the sealing device according to some embodiments.

FIG. 6 is a view for describing the sealing device according to some embodiments, and schematically shows enlarged views of the vicinity of the tip shroud 34 and the tip end portions of the fins as viewed from the circumferential direction.

The cavity 50 according to some embodiments is provided with the sealing device 100 as shown in FIGS. 2A to 2C, FIGS. 3A to 3C, FIGS. 4A to 4C, FIGS. 5A to 5C, and FIG. 6. The sealing device 100 of the embodiments includes not less than three arc-shaped fins (seal fins) 40 which are spaced from each other in the axial direction and each of which extends along the circumferential direction. That is, the fins 40 according to some embodiments are a plurality of sealing members disposed in an annular gap (cavity 50)

between a rotating member (shroud 34) and a stationary member (casing 2) in the axial direction.

For descriptive convenience, three fins 40 shown in each figure are spaced from each other in the axial direction, but there may be not less than four fins. Further, for descriptive convenience, the fins 40 shown in each figure are also referred to as a first fin 41, a second fin 42, and a third fin 43 in order from the axially upstream side.

Since the steam turbine 1 according to some embodiments shown in FIG. 1 includes the sealing device 100 described in detail later, it is possible to suppress the flow rate of leakage steam flows SL passing through the sealing portion (sealing device 100), and to suppress occurrence of a self-excited vibration in the steam turbine 1.

The fins 40 shown in each figure include the first fin 41 which is one of two outermost fins located on an outermost side in the axial direction, the second fin 42 disposed adjacent to the first fin 41 in the axial direction, and at least one third fin 43 disposed opposite to the first fin 41 across the second fin 42 in the axial direction.

The third fin 43 is preferably the other of the two outermost fins located on the outermost side in the axial direction. If not less than four fins 40 according to some embodiments are spaced from each other in the axial direction, at least the fin 40 disposed on the most axially downstream side preferably satisfies, as the third fin 43, at least either of a condition (a) or (b) described later. That is, the third fin 43 preferably includes the other outermost fin of the two outermost fins.

The fins 40 shown in each figure are each a member which has a partial arc shape extending from a base end portion 40a toward a tip end portion 40b in the radial direction, as well as extending in the circumferential direction as described above. More specifically, each of the fins 40 is formed to have a shape with a thickness in the axis AX direction gradually decreasing from the base end portion 40a toward the tip end portion 40b.

In the fins 40 shown in each figure, for example, as shown in FIGS. 2A, 3A, 4A, 5A, and 6, the fins (such as the first fin 41 and the third fin 43) projecting from the inner peripheral surface 25 of the casing 2 toward the shroud 34 and the fins (such as the second fins 42) projecting from the shroud 34 toward the inner peripheral surface 25 of the casing 2 may alternately be disposed in the axial direction.

Further, for example, as shown in FIGS. 2B, 3B, 4B, and 5B, the fins 40 shown in each figure may be disposed so as to project from the inner peripheral surface 25 of the casing 2 toward the shroud 34.

For example, as shown in FIGS. 2C, 3C, 4C, and 5C, the fins 40 shown in each figure may be disposed so as to project from the shroud 34 toward the inner peripheral surface 25 of the casing 2.

In some embodiments shown in the each figure, tip end portion 40b of each fin 40 forms a minute gap (seal gap) m with an outer surface 35 of the shroud 34 opposite to the tip end portion 40b or with the inner peripheral surface 25 of the casing 2. Considering a thermal expansion amount of the casing 2 or the rotor blade body 31, a centrifugal expansion amount of the rotor blade body 31, or the like, a dimension of the gap m in the radial direction is decided in a range in which the tip end portion 40b of the fin 40 does not contact a member of a counterpart opposite to the tip end portion 40b.

Of the cavities 50 according to some embodiments shown in each figure, a region on the upstream side of the first fin 41 will be referred to as a first cavity 51, a region defined between the first seal fin 41 and the second seal fin 42 will be referred to as a second cavity 52, a region defined between the second seal fin 42 and the third seal fin 43 will be referred to as a third cavity 53, and a region on the downstream side of the third fin 43 will be referred to as a fourth cavity 54.

In the steam turbine plant 10 according to some embodiments, the steam S from the steam supply source is supplied to the steam turbine 1 via the steam supply pipe 12.

The steam S supplied to the steam turbine 1 reaches the main passage 20. The steam S reaching the main passage 20 flows toward the downstream side while repeatedly expanding and turning a flow as the steam S flows through the main passage 20. Since the rotor blade body 31 has the airfoil cross-section, the steam S hits the rotor blade body 31 or a reaction force in expansion of the steam is also received inside inter-blade passages formed between the adjacent rotor blade bodies 31 along the circumferential direction, thereby rotating the rotor 3. Consequently, energy of the steam S is extracted as rotational power of the steam turbine 1.

The steam S flowing through the main passage 20 in the above-described process also flows into the aforementioned cavities 50. That is, the steam S flowing into the main passage 20 is divided into a main steam flow SM and the leakage steam flows SL after passing through the stator vane body 21. The main steam flow SM is introduced into the turbine rotor blade 30 without any leakage.

The leakage steam flows SL flow into the cavities 50 via between the shroud 34 and the casing 2. The steam S is set in a state in which a swirl component (circumferential velocity component) is increased after passing through the stator vane body 21, and a part of the steam S is separated and flows into the cavities 50 as the leakage steam flows SL. Therefore, similarly to the steam S, the leakage steam flows SL also include swirl components.

(As to Self-Excited Vibration in Steam Turbine 1)

As described above, in the rotary machine such as the steam turbine 1, it is known that, in the sealing portion for sealing between the casing and the rotor or the rotor blade, the working fluid deviating from the main passage flows in while having the swirling flow component given when passing through the nozzle, generating the swirling flow (so-called swirl flow) in the circumferential direction of the rotor. Due to the swirl flow, if the rotor is eccentric, a periodic pressure distribution with a peak in a direction different from an eccentric direction of the rotor is generated in the circumferential direction of the rotor, which may cause a self-excited vibration of the rotor when the swirl flow increases with a high output operation, for example. Thus, various structures for suppressing the swirl flow in the sealing portion have been devised.

In recent years, a rotary machine, such as a steam turbine or a gas turbine, is required to further improve turbine efficiency. Therefore, the rotary machine is required to suppress a leakage flow rate, that is, the flow rate of a working fluid that deviates from a main passage and passes through a sealing portion. However, if the leakage flow rate is suppressed, an exciting force of the above-described self-excited vibration may increase.

Thus, in some embodiments, the flow rate of the leakage steam flows SL passing through the sealing device 100 is suppressed, as well as occurrence of the self-excited vibration in the steam turbine 1 is suppressed as described below. Hereinafter, the detailed description thereof will be given.

(As to Specific Configuration for Suppressing Leakage Steam Flow and Suppressing Self-Excited Vibration)

For example, as shown in FIGS. 2A to 2C, FIGS. 4A to 4C, FIGS. 5A to 5C, and FIG. 6, in the sealing device 100 according to some embodiments, the third fin 43 preferably satisfies at least either of the following condition (a) or (b):
- (a) the third fin 43 is disposed to be inclined with respect to the radial direction such that the tip end portion 40b is located on the first fin 41 side in the axial direction relative to the base end portion 40a, and the third fin 43 has a larger inclination angle θ3 than the first fin 41 or the second fin 42 with respect to the radial direction; or
- (b) the third fin 43 has a larger radial dimension Hr than the first fin 41 or the second fin 42 so as to form the smaller seal gap m than the first fin 41 or the second fin 42.

(As to Case where Above Condition (a) is Satisfied)

As shown in each figure, it is assumed that the sealing device 100 according to some embodiments is disposed such that the third fin 43 is located on the axially downstream side of the first fin 41. Then, it is assumed that the leakage steam flow SL passes through the seal gap m which is the gap between the tip end portion 40b of each of the first fin 41, the second fin 42, and the third fin 43 and the surface of the member opposite to the tip end portion 40b in the radial direction.

For example, consider a case where the third fin 43 is configured to satisfy the above condition (a) and in the third cavity 53 facing an axially upstream side surface 43u of the third fin, as shown in FIGS. 2A, 2B, 4A, 4B, 5A, 5B, and 6, a radial flow SLr of the leakage steam flow SL flows from the base end portion 40a side toward the tip end portion 40b side of the third fin 43 along the side surface 43u.

In this case, as compared with a case where the third fin 43 is not configured to satisfy the above condition (a), the radial flow SLr flowing along the side surface 43u can give more contracted flow effect of contracting the flow in the radial direction to the leakage steam flow SL flowing through the above-described seal gap m.

Figure 7A:
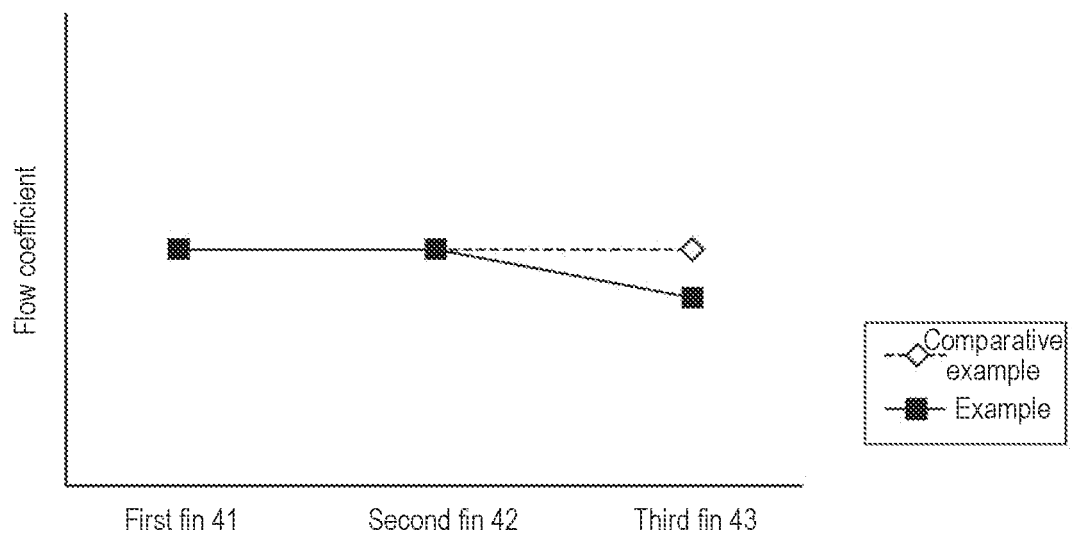
FIG. 7A is a graph for describing a contracted flow effect by a third fin.

FIG. 7A is a graph for describing the above-described contracted flow effect by the third fin 43 satisfying the above condition (a), and shows a flow coefficient in the seal gap m formed by each fin 40. In FIG. 7A, data described as an example is a flow coefficient which is related to the sealing device 100 with the third fin 43 satisfying the above condition (a), and data described as a comparative example is a flow coefficient which is related to a sealing device where the third fin 43 has the same inclination angle θ3 as the first fin 41 or the second fin 42.

As shown in FIG. 7A, by satisfying the above condition (a), it is possible to reduce the flow coefficient in the seal gap m formed by the third fin 43.

Thus, in the sealing device 100 shown in FIGS. 2A, 2B, 4A, 4B, 5A. 5B, and 6, it is difficult for the working fluid to pass through the seal gap m that is the gap between the tip end portion 40b of the third fin 43 and the outer surface 35 of the shroud 34 which is the surface of the member opposite to the tip end portion 40b in the radial direction.

Therefore, in the sealing device 100 shown in FIGS. 2A, 2B, 4A, 4B, 5A, 5B, and 6, it is possible to increase the differential pressure between the third cavity 53 which is the cavity 50 on the upstream side and the fourth cavity 54 which is the cavity 50 on the downstream side of the third fin 43.

Herein, if the first fin 41 and the third fin 43 are respectively the outermost fins located on the outermost side in the axial direction, the pressure difference between the first cavity 51 which is the cavity 50 on the upstream side of the first fin 41 and the fourth cavity 54 which is the cavity 50 on the downstream side of the third fin 43, that is, the front-rear differential pressure of the sealing device 100 is substantially equal to a pressure difference between an inlet side and an outlet side of the rotor blade body 31. Thus, if the differential pressure between the third cavity 53 and the fourth cavity 54, that is, the front-rear differential pressure of the third fin 43 increases, the differential pressure between the first cavity 51 and the second cavity 52 which is the cavity 50 on the downstream side of the first fin 41, that is, the front-rear differential pressure of the first fin 41 decreases.

Figure 7B:
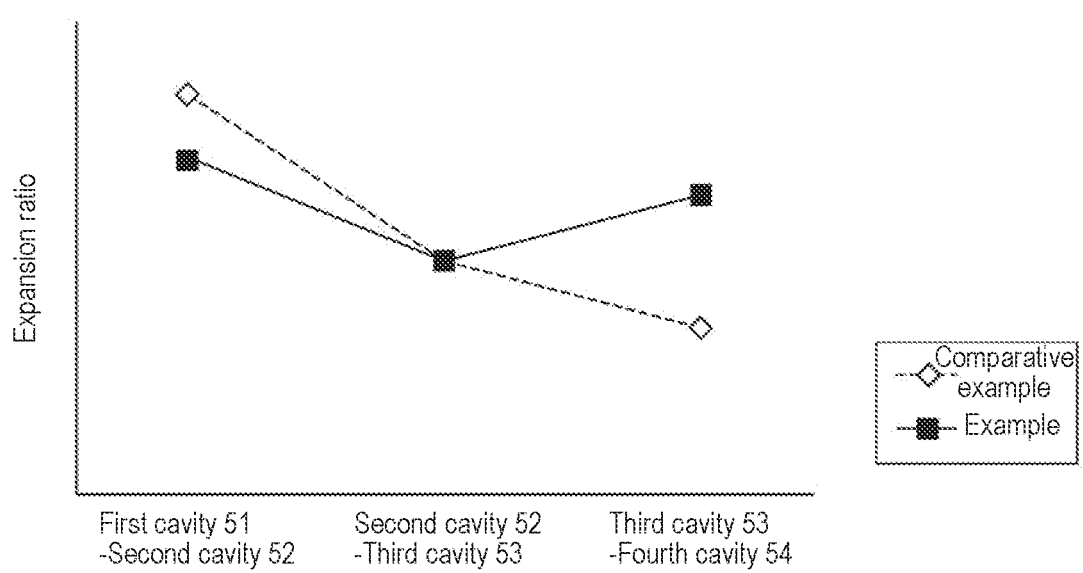
FIG. 7B is a graph for describing a differential pressure in each fin.

FIG. 7B is a graph for describing a differential pressure in each fin 40, and shows the expansion ratio before and after the leakage steam flow SL passes through each fin 40. In FIG. 7B, data described as an example is the expansion ratio which is related to the sealing device 100 with the third fin 43 satisfying the above condition (a), and data described as a comparative example is the expansion ratio which is related to the sealing device where the third fin 43 has the same inclination angle θ3 as the first fin 41 or the second fin 42.

As shown in FIG. 7B, by satisfying the above condition (a), since the front-rear differential pressure of the third fin 43 increases, the expansion ratio before and after the leakage steam flow SL passes through the third fin 43 increases. Further, since the front-rear differential pressure of the first fin 41 decreases due to the increase in the front-rear differential pressure of the third fin 43, the expansion ratio before and after the leakage steam flow SL passes through the third fin 43 decreases.

In general, the higher the circumferential swirl velocity of the working fluid in the sealing portion (sealing device 100), the more likely the above-described self-excited vibration is to occur. Further, in general, the circumferential swirl velocity of the working fluid in the sealing portion is higher on the upstream side than on the downstream side. In general, by suppressing the front-rear differential pressure of the seal fin, it is possible to suppress the exciting force due to the working fluid in the cavity on the downstream side of the seal fin.

Therefore, since the exciting force due to the leakage steam flow SL in the second cavity 52 can be suppressed by suppressing the front-rear differential pressure of the first fin 41 as described above, it is possible to suppress occurrence of the self-excited vibration described above.

Further, as described above, since the front-rear differential pressure of the third fin 43 can be increased, it is possible to suppress the flow rate of the working fluid passing through the sealing device 100.

Figure 7C:
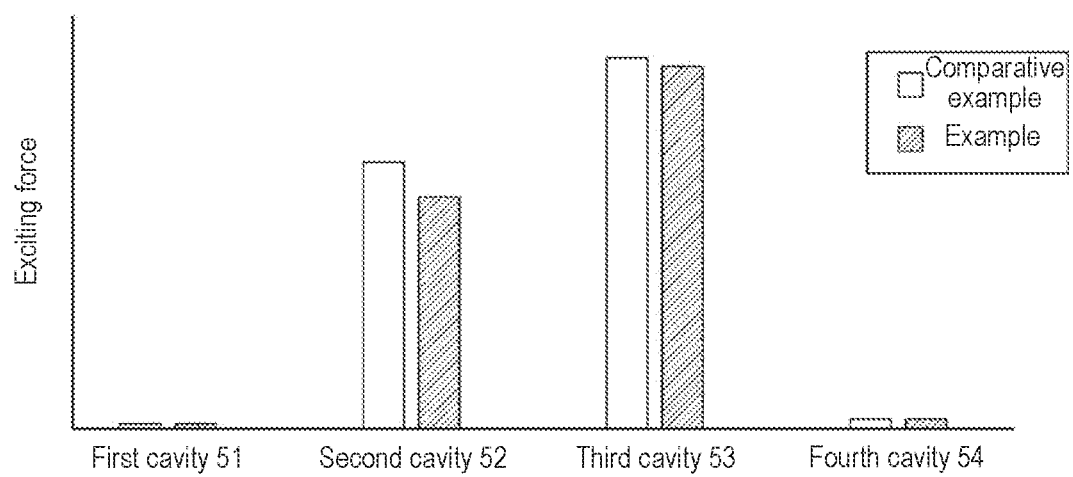
FIG. 7C is a graph for describing an exciting force generated in each cavity.

FIG. 7C is a graph for describing the exciting force generated in each cavity 50. In FIG. 7C, data described as an example is the exciting force which is related to the sealing device 100 with the third fin 43 satisfying the above condition (a), and data described as a comparative example is the exciting force which is related to the sealing device where the third fin 43 has the same inclination angle θ3 as the first fin 41 or the second fin 42.

As shown in FIG. 7C, by satisfying the above condition (a), it is possible to suppress the exciting forces in the second cavity 52 and the third cavity 53. Further, by satisfying the above condition (a), it is possible to suppress the exciting force in the second cavity 52 more than the exciting force in the third cavity 53.

For example, consider a case where the third fin 43 is configured to satisfy the above condition (a) and in the third cavity 53 facing the axially upstream side surface 43u of the third fin 43, as shown in FIGS. 2C, 4C, and 5C, the radial flow SLr flows from the tip end portion 40*b* side toward the base end portion 40*a* side of the third fin 43 along the side surface 43*u*.

In this case, as compared with the case where the third fin 43 is not configured to satisfy the above condition (a), the radial flow SLr easily flows from the tip end portion 40*b* side toward the base end portion 40*a* side of the third fin 43 along the side surface. Thus, the leakage steam flow SL flowing from the second fin 42 side toward the third fin 43 side less flows toward the downstream side of the third fin 43, making it possible to increase the front-rear differential pressure of the third fin 43. Consequently, since the front-rear differential pressure of the first fin 41 can be suppressed, it is possible to suppress occurrence of the self-excited vibration described above.

Further, since the front-rear differential pressure of the third fin 43 can be increased, it is possible to suppress the flow rate of the leakage steam flow SL passing through the sealing device 100.

(As to Case where Above Condition (b) is Satisfied)

Just like when describing the above condition (a), it is assumed that the sealing device 100 according to some embodiments is disposed such that the third fin 43 is located on the axially downstream side of the first fin 41. Then, it is assumed that the leakage steam flow SL passes through the seal gap m which is the gap between the tip end portion 40*b* of each of the first fin 41, the second fin 42, and the third fin 43 and the surface of the member opposite to the tip end portion 40*b* in the radial direction.

For example, it is assumed that the third fin 43 is configured to satisfy the above condition (b).

In this case, as compared with the case where the third fin 43 is not configured to satisfy the above condition (b), it is possible to increase the front-rear differential pressure of the third fin 43. Consequently, since the front-rear differential pressure of the first fin 41 can be suppressed, it is possible to suppress occurrence of the self-excited vibration described above.

Further, since the front-rear differential pressure of the third fin 43 can be increased, it is possible to suppress the flow rate of the leakage steam flow SL passing through the sealing device 100.

If not less than four fins 40 according to some embodiments are spaced from each other in the axial direction, at least the fin 40 disposed on the most axially downstream side preferably satisfies, as the third fin 43, at least either of the above condition (a) or (b). That is, the third fin 43 preferably includes the other outermost fin of the two outermost fins. Since at least the fin 40 disposed on the most axially downstream side satisfies, as the third fin 43, at least either of the above condition (a) or (b), as described above, it is possible to suppress occurrence of the self-excited vibration by suppressing the front-rear differential pressure of the first fin 41, and it is possible to suppress the flow rate of the leakage steam flow SL passing through the sealing device 100 by increasing the front-rear differential pressure of the third fin 43.

For example, like the sealing device 100 shown in FIGS. 2B, 2C, 4B, 4C, 5B, and 5C, except for the above-described other outermost fin as the third fin 43, the other fins 40 may have the same shape.

If the other fins 40 other than the above-described other outermost fin are configured to satisfy at least either of the above condition (a) or (b), the self-excited vibration is more likely to occur, though the flow rate of the leakage steam flow SL can further be suppressed. Therefore, like the sealing device 100 shown in FIGS. 2B, 2C, 4B, 4C. 5B, and 5C, except for the above-described other outermost fin as the third fin 43, it is possible to suppress occurrence of the self-excited vibration by configuring the other fins 40 to have the same shape.

(As to Curved Concave Surface 430)

As shown in FIGS. 4A to 4C, in the sealing device 100 according to some embodiments, on the base end portion 40*a* side of the third fin 43, the side surface 43*u* of the third fin 43 facing toward the first fin 41 in the axial direction preferably has a curved concave surface 430.

In the sealing device 100 shown in FIGS. 4A and 4B, the curved concave surface 430 is a curved surface smoothly connecting the side surface 43*u* of the third fin 43 with a surface of the inner peripheral surface 25 of the casing 2 on the axially upstream side of the side surface 43*u*, and has a center of curvature O on the axially upstream side of the side surface 43*u*.

In the sealing device 100 shown in FIG. 4C, the curved concave surface 430 is a curved surface smoothly connecting the side surface 43*u* of the third fin 43 with a surface of the outer surface 35 of the shroud 34 on the axially upstream side of the side surface 43*u*, and has the center of curvature O on the axially upstream side of the side surface 43*u*.

Consequently, the flow of the radial flow SLr of the leakage steam flow SL in the cavity 50 (third cavity 53) facing the side surface 43*u* of the third fin 43 is guided by the curved concave surface 430 to easily flow.

Thus, as shown in FIGS. 4A and 4B, if the radial flow SLr flows from the base end portion 40*a* side toward the tip end portion 40*b* side of the third fin 43 along the side surface 43*u* in the third cavity 53, the radial flow SLr flowing along the side surface 43*u* can give more contracted flow effect to the leakage steam flow SL flowing through the seal gap m. Thus, it is possible to increase the front-rear differential pressure of the third fin 43.

Further, as show in FIG. 4C, if the radial flow SLr flows from the tip end portion 40*b* side toward the base end portion 40*a* side of the third fin 43 along the side surface 43*u*, the radial flow SLr easily flows from the tip end portion 40*b* side toward the base end portion 40*a* side of the third fin 43 along the side surface 43*u*. Consequently, the leakage steam flow SL less flows toward the downstream side of the third fin 43, making it possible to increase the front-rear differential pressure of the third fin 43.

(As to Expanded Portion 541 of Fourth Cavity 54)

As shown in FIGS. 5A and 5B, the steam turbine 1 according to some embodiments includes the cavity 50 (fourth cavity 54) defined by third fin 43 which is the outermost fin 40 and the inner surface 250 of the casing 2 of the inner surface 250 on the axially downstream side of the outermost fin 40 (third fin 43). The fourth cavity 54 preferably includes an expanded portion (casing-side expanded portion) 541 where the above-described inner surface 250 is expanded radially outward or axially downstream.

As shown in FIGS. 5A and 5B, in the steam turbine 1 according to some embodiments, at least a part of a radially outer surface of the expanded portion 541 may be defined by, for example, an inner peripheral surface 251 which is located on the radially outer side of the inner peripheral surface 25 facing the third cavity 53. Further, as shown in FIGS. 5A and 5B, in the steam turbine 1 according to some embodiments, at least a part of an axially downstream surface of the expanded portion 541 may have the radially outer surface defined by an annular inner wall surface 253 described below. The annular inner wall surface 253 is connected to, for example, an inner peripheral surface 25A of the casing 2 defining the main passage 20 on the axially downstream side of the rotor blade body 31, and faces axially upstream on the axially downstream side of an inner wall surface 25B which is the inner surface 25O facing axially upstream on the axially upstream side of the inner peripheral surface 25A.

If the fourth cavity 54 includes the expanded portion 541, the leakage steam flow SL after passing through the seal gap m, which is the gap between the tip end portion 40b of the third fin 43 and the surface of the member (for example, the outer surface 35 of the shroud 34) opposite to the tip end portion 40b in the radial direction, expands as compared with the case where the fourth cavity 54 does not include the expanded portion 541, making it possible to increase the front-rear differential pressure of the third fin 43.

As shown in FIG. 5C, an expanded portion (shroud-side expanded portion) 543 may be provided by cutting out a region of the shroud 34 on the downstream side of the third fin 43 from the radially outer side. Further, in the steam turbine 1 according to some implementations, the casing-side expanded portion 541 and the shroud-side expanded portion 543 may be provided.

(As to Shape of Tip End Portion 40b of Third Fin 43)

In the sealing device 100 according to some embodiments, as shown in FIG. 6, a radius of curvature ru of a corner 431 between a tip end surface 43t and the side surface 43u of the third fin 43 facing toward the first fin 41 in the axial direction is preferably less than the radius of curvature ru of a corner 421 between a tip end surface 42t and a side surface 42u of the second fin 42 facing toward the first fin 41 in the axial direction.

Thus, in the third cavity, if the radial flow SLr flows from the base end portion 40a side toward the tip end portion 40b side of the third fin 43 along the side surface 43u of the third fin 43, the radial flow SLr easily separates from the side surface 43u on the tip end portion 40b side. Therefore, the radial flow SLr flowing along the side surface 43u can give more contracted flow effect to the leakage steam flow SL flowing through the seal gap m. Thus, it is possible to increase the front-rear differential pressure of the third fin 43.

In the sealing device 100 according to some embodiments, as shown in FIG. 6, a radius of curvature rd of a corner 433 between the tip end surface 43t and a side surface 43d of the third fin 43 facing axially downstream may be the same as the radius of curvature ru of the corner 431. Further, the radius of curvature rd of the corner 423 between the tip end surface 42t and the side surface 42d of the second fin 42 facing axially downstream may be the same as the radius of curvature ru of the corner 421.

The present disclosure is not limited to the above-described embodiments, and also includes an embodiment obtained by modifying the above-described embodiments and an embodiment obtained by combining these embodiments as appropriate.

For example, the third fin 43 of an embodiment described above may be configured to satisfy both the above conditions (a) and (b).

Further, the sealing device 100 shown in FIGS. 2A to 2C, 3A to 3C, 5A to 5C, and 6 may include the curved concave surface 430 as shown in FIGS. 4A to 4C.

The steam turbine 1 shown in FIGS. 2A to 2C, 3A to 3C, 4A to 4C, and 6 may include at least either of the casing-side expanded portion 541 or the shroud-side expanded portion 543 as shown in FIGS. 5A to 5C.

The contents described in the above embodiments would be understood as follows, for instance.

(1) A sealing device according to at least one embodiment of the present disclosure includes: not less than three arc-shaped fins spaced from each other in an axial direction, each of the arc-shaped fins extending along a circumferential direction. The arc-shaped fins include: a first fin which is one of two outermost fins located on an outermost side in the axial direction; a second fin disposed adjacent to the first fin in the axial direction; and at least one third fin disposed opposite to the first fin across the second fin in the axial direction. The third fin satisfies at least either of following condition (a) or (b): (a) the third fin is disposed to be inclined with respect to a radial direction such that a tip end portion is located on a side of the first fin in the axial direction relative to a base end portion, and the third fin has a larger inclination angle than the first fin or the second fin with respect to the radial direction; or (b) the third fin has a larger radial dimension than the first fin or the second fin so as to form a smaller seal gap than the first fin or the second fin.

With the above configuration (1), since the third fin 43 is configured to satisfy at least either of the above condition (a) or (b), in the steam turbine 1 as an example of the rotary machine that includes the sealing device 100 having the above configuration (1), it is possible to suppress the flow rate of the leakage steam flow SL which is the working fluid passing through the sealing portion (sealing device 100), and to suppress occurrence of the self-excited vibration in the steam turbine 1.

(2) In some embodiments, in the above configuration (1), the third fin 43 preferably includes the other outermost fin 40 of the two outermost fins 40.

Since at least the fin 40 disposed on the most axially downstream side satisfies, as the third fin 43, at least either of the above condition (a) or (b), as described above, it is possible to suppress occurrence of the self-excited vibration by suppressing the front-rear differential pressure of the first fin 41, and it is possible to suppress the flow rate of the leakage steam flow SL passing through the sealing device 100 by increasing the front-rear differential pressure of the third fin 43.

(3) In some embodiments, in the above configuration (2), except for the above-described other outermost fin 40 serving as the third fin 43, the arc-shaped fins 40 preferably have a same shape.

If the other fins 40 other than the above-described other outermost fin are configured to satisfy at least either of the above condition (a) or (b), the self-excited vibration is more likely to occur, though the flow rate of the leakage steam flow SL can further be suppressed. Therefore, like the sealing device 100 shown in FIGS. 2B, 2C, 4B, 4C, 5B, and 5C, except for the above-described other outermost fin as the third fin 43, it is possible to suppress occurrence of the self-excited vibration by configuring the other fins 40 to have the same shape.

(4) In some embodiments, in any one of the above configurations (1) to (3), on a base end side (base end portion 40a side) of the third fin 43, a side surface 43u of the third fin 43 facing toward the first fin 41 in the axial direction preferably has a curved concave surface 430.

With the above configuration (4), as described above, it is possible to increase the front-rear differential pressure of the third fin 43.

(5) In some embodiments, in any one of the above configurations (1) to (4), a radius of curvature ru of a corner 431 between a tip end surface 43t and a side surface 43u of the third fin 43 facing toward the first fin 41 in the axial direction is preferably less than the radius of curvature ru of a corner 421 between a tip end surface 42t and a side surface 42u of the second fin 42 facing toward the first fin 41 in the axial direction.

With the above configuration (5), in the third cavity 53 which is faced by the side surface 43u of the third fin 43 facing toward the first fin 41, if the radial flow SLr flows from the base end portion 40a side toward the tip end portion 40b side of the third fin 43 along the side surface 43u, the radial flow SLr easily separates from the side surface 43u on the tip end portion 40b side, allowing the radial flow SLr flowing along the side surface 43u to give more contracted flow effect to the leakage steam flow SL flowing through the seal gap m. Thus, it is possible to increase the front-rear differential pressure of the third fin 43.

(6) A steam turbine 1 which is a rotary machine according to at least one embodiment of the present disclosure includes: the sealing device 100 as defined in any one of the above configurations (1) to (5); a casing 2; a rotor body 11 for rotating around an axis AX in the casing 2; a plurality of rotor blade bodies 31 mounted so as to extend from the rotor body 11 in a radial direction; and a shroud (tip shroud) 34 connected to a tip end portion of each of the plurality of rotor blade bodies 31. The third fin 43 is located on an axially downstream side of the rotor body 11 relative to the first fin 41.

With the above configuration (6), since the steam turbine 1 includes the sealing device 100 as defined in any one of the above configurations (1) to (5), it is possible to suppress the flow rate of the leakage steam flow SL passing through the sealing device 100, and to suppress occurrence of the self-excited vibration in the steam turbine 1.

(7) In some embodiments, in the above configuration (6), the third fin 43 includes the other outermost fin 40 of the two outermost fins 40. The steam turbine 1 which is the rotary machine includes a cavity 50 (fourth cavity 54) defined by the outermost fin 40 (third fin 43) and an inner surface 250 of the casing 2 of the inner surface 250 on the axially downstream side of the outermost fin 40 (third fin 43). The fourth cavity 54 preferably includes an expanded portion 541 where the above-described inner surface 250 is expanded radially outward or axially downstream.

With the above configuration (7), since the leakage steam flow SL after passing through the seal gap m, which is the gap between the tip end portion 40b of the third fin 43 and the surface of the member opposite to the tip end portion 40b in the radial direction, expands as compared with the case where the fourth cavity 54 does not include the expanded portion 541, it is possible to increase the front-rear differential pressure of the third fin 43.

(8) In some embodiments, in the above configuration (6) or (7), the arc-shaped fins 40 may project from an inner peripheral surface 25 of the casing 2 toward the shroud 34.

With the above configuration (8), since all the arc-shaped fins 40 of the sealing device 100 are configured to project from the inner peripheral surface 25 of the casing 2 toward the shroud 34, there is no possibility that the arc-shaped fins 40 come into contact with each other even if the axial relative position of the casing 2 and the rotor body 11 changes due to thermal expansion.

(9) In some embodiments, in the above configuration (6) or (7), the arc-shaped fins 40 may project from the shroud 34 toward an inner peripheral surface 25 of the casing 2.

With the above configuration (9), since all the arc-shaped fins 40 of the sealing device 100 are configured to project from the shroud 34 toward the inner peripheral surface 25 of the casing 2, there is no possibility that the arc-shaped fins 40 come into contact with each other even if the axial relative position of the casing 2 and the rotor body 11 changes due to thermal expansion.

(10) In some embodiments, in the above configuration (6) or (7), in the arc-shaped fins 40, fins 40 projecting from an inner peripheral surface 25 of the casing 2 toward the shroud 34 and fins 40 projecting from the shroud 34 toward the inner peripheral surface 25 of the casing 2 may alternately be disposed in the axial direction.

With the above configuration (10), since the fins 40 projecting from the inner peripheral surface 25 of the casing 2 toward the shroud 34 and the fins 40 projecting from the shroud 34 toward the inner peripheral surface 25 of the casing 2 are alternately disposed in the axial direction, it is possible to further suppress the flow rate of the leakage steam flow SL passing through the sealing device 100.

REFERENCE SIGNS LIST

1 Steam turbine
2 Casing
3 Rotor
11 Rotor body
25 Inner peripheral surface
30 Turbine rotor blade
31 Rotor blade body
34 Shroud (tip shroud)
40 Fin (seal fin)
40a Base end portion
40b Tip end portion
41 First fin
42 Second fin
43 Third fin
50 Cavity
51 First cavity
52 Second cavity
53 Third cavity
54 Fourth cavity
100 Sealing device
430 Curved concave surface
541 Expanded portion (casing-side expanded portion)
543 Expanded portion (shroud-side expanded portion)

The invention claimed is:
1. A rotary machine, comprising:
a casing;
a rotary body for rotating around an axis in the casing;
a plurality of rotor blade bodies mounted so as to extend from the rotor body in a radial direction;
a shroud connected to a tip end portion of each of the plurality of rotor blade bodies; and
a sealing device including not less than three arc-shaped fins spaced from each other in an axial direction in a cavity formed between an inner peripheral surface of the casing and the shroud, each of the arc-shaped fins extending along a circumferential direction,
wherein the arc-shaped fins include:
a first fin which is one of two outermost fins located on an outermost side in the axial direction;
a second fin disposed adjacent to the first fin in the axial direction; and
at least one third fin disposed opposite to the first fin across the second fin in the axial direction, and
wherein the third fin satisfies at least either of following condition (a) or (b):
(a) the third fin is disposed to be inclined with respect to a radial direction such that a tip end portion is located on a side of the first fin in the axial direction relative to a base end portion, and the third fin has a larger inclination angle than the first fin or the second fin with respect to the radial direction; or (b) the third fin has a larger radial dimension than the first fin or the second fin so as to form a smaller seal gap than the first fin or the second fin.

2. The sealing device according to claim 1, wherein the third fin includes the other outermost fin of the two outermost fins.

3. The sealing device according to claim 2, wherein except for the other outermost fin serving as the third fin, the arc-shaped fins have a same shape.

4. The sealing device according to claim 1, wherein, on a base end side of the third fin, a side surface of the third fin facing toward the first fin in the axial direction has a curved concave surface.

5. The sealing device according to claim 1, wherein a radius of curvature of a corner between a tip end surface and a side surface of the third fin facing toward the first fin in the axial direction is less than the radius of curvature of a corner between a tip end surface and a side surface of the second fin facing toward the first fin in the axial direction.

6. The rotary machine, according to claim 1, wherein the third fin is located on an axially downstream side of the rotor body relative to the first fin.

7. The rotary machine according to claim 6, wherein the third fin includes the other outermost fin of the two outermost fins,
wherein the rotary machine includes a cavity defined by the outermost fin and an inner surface of the casing of the inner surface on the axially downstream side of the outermost fin, and
wherein the cavity includes an expanded portion where the inner surface is expanded radially outward or axially downstream.

8. The rotary machine according to claim 6, wherein the arc-shaped fins project from an inner peripheral surface of the casing toward the shroud.

9. The rotary machine according to claim 6, wherein the arc-shaped fins project from the shroud toward an inner peripheral surface of the casing.

10. The rotary machine according to claim 6, wherein, in the arc-shaped fins, fins projecting from an inner peripheral surface of the casing toward the shroud and fins projecting from the shroud toward the inner peripheral surface of the casing are alternately disposed in the axial direction.

11. A rotary machine, comprising:
a casing;
a rotary body for rotating around an axis in the casing;
a plurality of rotor blade bodies mounted so as to extend from the rotor body in a radial direction;
a shroud connected to a tip end portion of each of the plurality of rotor blade bodies; and
a sealing device including not less than three arc-shaped fins spaced from each other in an axial direction in a cavity formed between an inner peripheral surface of the casing and the shroud, each of the arc-shaped fins extending along a circumferential direction,
wherein the arc-shaped fins include:
a first fin which is one of two outermost fins located on an outermost side in the axial direction;
a second fin disposed adjacent to the first fin in the axial direction; and
at least one third fin disposed opposite to the first fin across the second fin in the axial direction, and
wherein the third fin is disposed to be inclined with respect to a radial direction such that a tip end portion is located on a side of the first fin in the axial direction relative to a base end portion, and the third fin has a larger inclination angle than the second fin with respect to the radial direction.

* * * * *